United States Patent [19]

Bollinger

[11] 4,247,970
[45] Feb. 3, 1981

[54] APPARATUS FOR FORMING EXPANDED METAL SUCH AS BATTERY GRIDS

[75] Inventor: William C. Bollinger, Bloomfield Hills, Mich.

[73] Assignee: Bernal Rotary Systems, Inc., Troy, Mich.

[21] Appl. No.: 29,253

[22] Filed: Apr. 11, 1979

[51] Int. Cl.³ .................... B23D 31/02; B23P 15/00
[52] U.S. Cl. ............................................ 29/2; 29/6.1
[58] Field of Search .................... 29/6.1, 6.2, 623.1, 29/2; 72/203

[56] References Cited

U.S. PATENT DOCUMENTS

| 619,340 | 2/1899 | Pitkin | 29/6.1 |
| 643,640 | 2/1900 | Fordyce et al. | 29/6.1 |
| 664,379 | 12/1900 | Bradford | 29/6.1 |
| 698,448 | 4/1902 | Caldwell | 29/6.1 |
| 741,016 | 10/1903 | Craven | 29/6.1 |
| 3,760,470 | 9/1973 | Felsenthal | 29/6.1 |
| 3,890,160 | 6/1975 | Daniels, Jr. | 29/623.1 |

Primary Examiner—Horace M. Culver
Attorney, Agent, or Firm—Joseph W. Farley

[57] ABSTRACT

Rotary apparatus comprising a die cutting station followed by a series of segment forming stations, a levelling station and a winding station continuously works a strip of lead into a configuration suitable for battery grid plates having expanded segments forming reticulations extending inwardly from parallel side edges of the strip to a medial unexpanded portion. The rotary die section includes rotary cutting and stripping dies which perforate the medial portion of the strip. At each segment forming station, a pair of upper coaxial shearing rollers, having peripherally projecting lobes each in the shape of one-half of an expanded segment, are transversely spaced to engage one face of the strip adjacent to the side edges thereof; and each shearing roller, in conjunction with a lower cylindrical supporting roller engaging the opposite face of the strip, has a shearing action thereon as the strip is fed through the station by a feeding roller engaging the perforated medial portion of the strip. The shearing and supporting rollers of successive segment forming stations are mounted in progressive converging relation with the medial portion of the strip. All rollers of the segment forming stations are connected to driving mechanism which rotates them in unison, thereby causing the reticulations to be continuously and progressively developed by shearing the segments thereof downwardly from the plane of the medial portion of the strip. The strip is flattened by rollers at the levelling station and coiled on a reel at the winding station.

17 Claims, 7 Drawing Figures

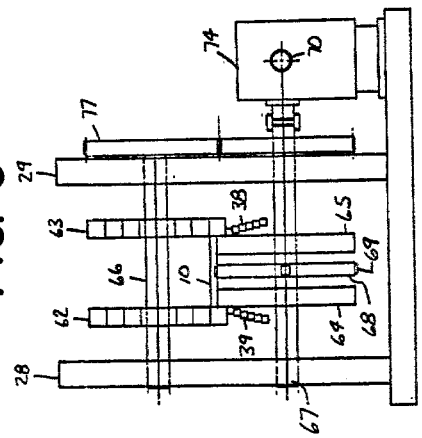
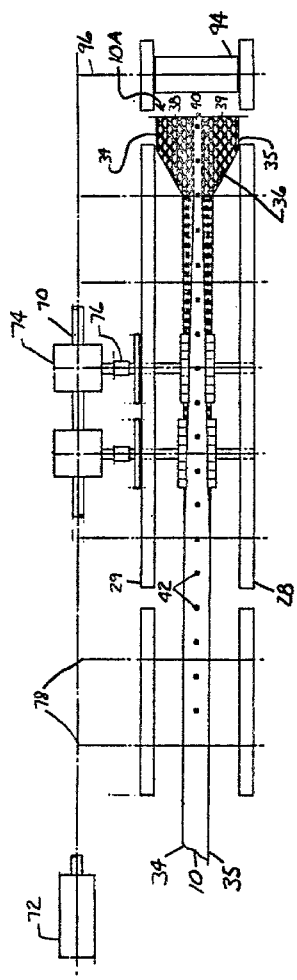
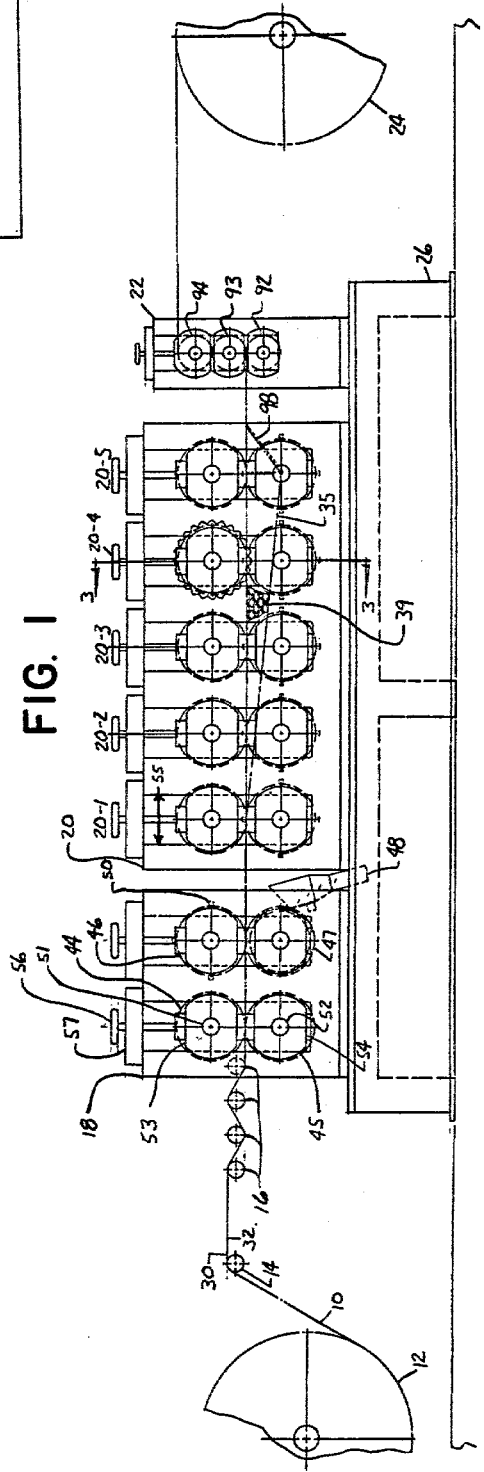

APPARATUS FOR FORMING EXPANDED METAL SUCH AS BATTERY GRIDS

This invention relates to improvements in apparatus for forming expanded metal, such apparatus being particularly but not exclusively useful in the manufacture of grids for lead-acid batteries.

Expanded metal for battery grids and other articles is presently made by employing a guillotine-type expander equipped with two converging rows of cutters and reciprocating dies through which a strip of metal is fed step by step. Expanders of this type, as further described in U.S. Pat. Nos. 1,482,600 and 3,853,626, progressively cut and stretch the metal strip into wire-like segments to form reticulations extending inwardly from the side edges of the strip. The reciprocating action of the dies and stepwise movement of the strip necessarily limit the speed at which a strip of metal can be fed through an expander of the guillotine type, and hence limit the production rate of apparatus, such as disclosed in Pat. No. 3,853,626, for the continuous manufacture of battery grids.

These limitations are overcome by the apparatus of the present invention which makes it possible to form a strip of metal into expanded segments of a reticulation at a production rate exceeding that attainable with a guillotine-type expander. The apparatus to be particularly described herein applied this increased production capability to the manufacture of battery grids as an illustration of the utility of the invention.

The apparatus of the invention for forming from a strip of lead, having opposed faces and longitudinally parallel side edges, battery grid plates with expanded segments forming reticulations extending inwardly from the side edges to a medial unexpanded portion of the strip, essentially comprises frame structure, and a plurality of segment expanding stations carried by the frame structure and arranged successively along a path of travel of the strip through the stations. Each segment expanding station includes a pair of shearing rollers each having a base circle and a periphery formed by a plurality of lobes each extending outwardly from and inwardly to the base circle in a configuration corresponding to that of one-half of an expanded segment, cylindrical supporting roller means, and means mounting the pair of shearing rollers and the supporting roller means for rotation on parallel axes extending transversely to the path of travel of the strip and spaced from the opposed faces of the strip, the pair of shearing rollers being coaxially mounted in transverse spacing for engagement with portions of one face of the strip adjacent to the side edges thereof, and the supporting roller means being mounted for engagement with the opposite face of the strip intermediate the pair of shearing rollers, the supporting roller means having a pair of axially perpendicular end surfaces overlapped by and in shearing relation with the lobes of the pair of shearing rollers. The shearing rollers and supporting roller means of all segment expanding stations are rotatable in unison by suitable driving means.

The apparatus also comprises feeding means for engaging and continuously advancing the strip along the path of travel, the feeding means including at each segment expanding station, a feeder roller coaxial and rotatable with either the pair of shearing rollers or the supporting roller means, the feeding roller having a periphery provided with indexing means engageable with the medial portion of the strip.

The apparatus further comprises rotary die means carried by the frame structure at the entrance end of the path of travel of the strip for forming apertures at equally spaced intervals in the medial portion thereof; and, the aforementioned indexing means comprises a plurality of equally spaced projections on the periphery of the feeding roller engageable with the apertures in the medial portion of the strip.

In the preferred form of apparatus to be described herein, the segment expanding stations are arranged so that the path of travel therethrough is generally horizontal, the axes of all pairs of shearing rollers are located above the path of travel and the axes of all supporting roller means are located below the path of travel, whereby the reticulations are formed by progressively expanding the segments thereof downwardly from the plane of the strip as it continuously moves along the path of travel. Levelling roller means are carried by the frame structure following the last segment expanding station in the direction of travel for flattening the reticulations into a common plane with the medial portion of the strip.

The foregoing and other features and advantages of the invention will appear from the description to follow of the presently preferred embodiments thereof shown in the accompanying drawings,

DESCRIPTION OF THE DRAWINGS

FIG. 1 is a side elevation schematically illustrating apparatus embodying the present invention for expanding a strip of metal;

FIG. 2 is a fragmentary plan view of a portion of the apparatus of FIG. 1;

FIG. 3 is a sectional elevation taken as indicated by the line 3—3 of FIG. 2;

DESCRIPTION OF THE PREFERRED EMBODIMENTS

Figure 4:
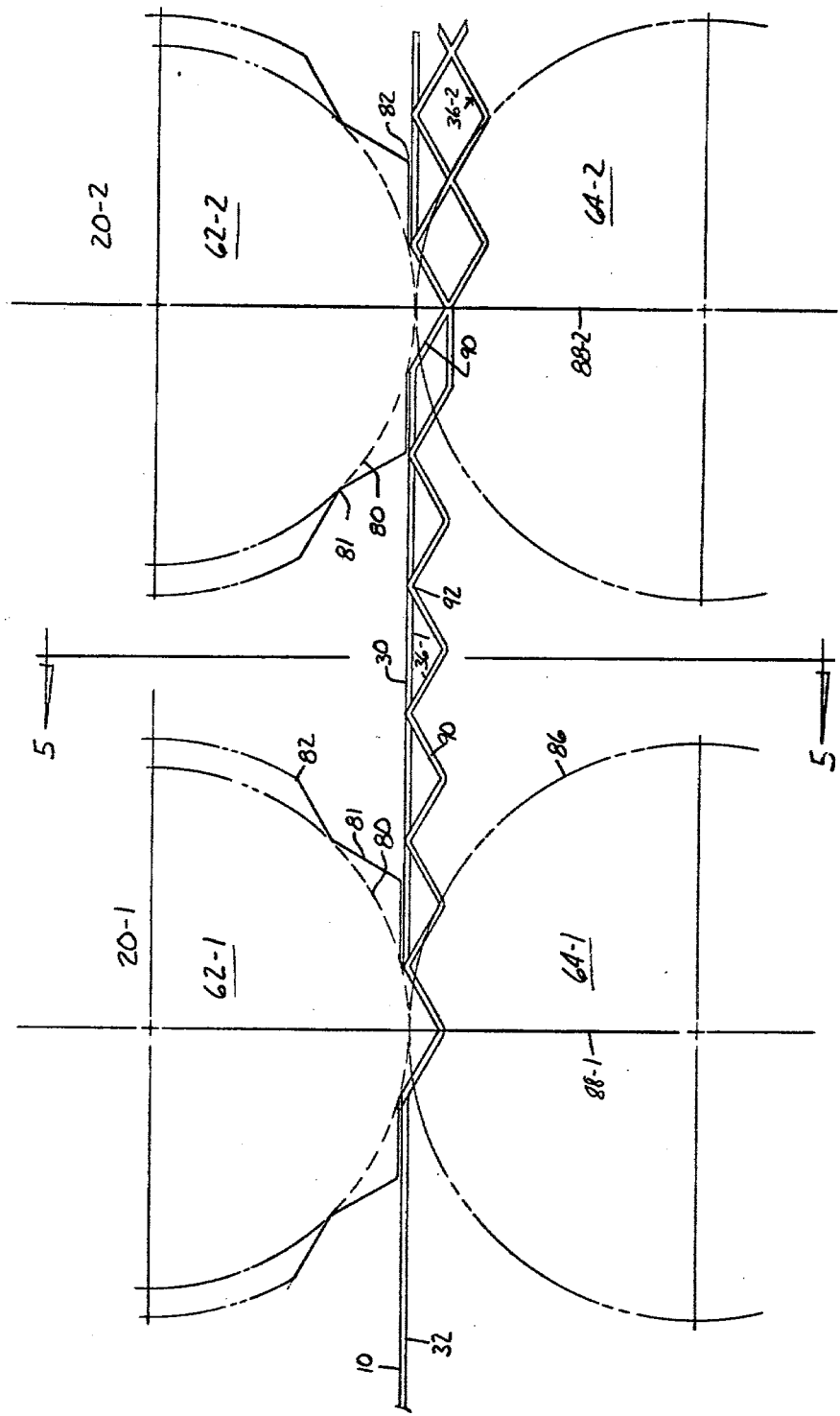
FIG. 4 is an enlarged fragmentary elevation illustrating the first two expanding stations of the apparatus of FIG. 1 at one side edge of the strip.

In the apparatus of FIG. 1 a strip of metal 10 from a coil on an unwinding reel 12 is trained over a guide roller 14, over and under a cluster of de-curling or straightening rollers 16, and is then fed along a horizontal path of travel through a perforating station 18, through a plurality of segment expanding stations generally identified by the reference 20, through a levelling station 22, to a winding reel 24. The principal components of the apparatus are the perforating station 18, the segment expanding station 20 and the levelling station 22; these components are carried by suitable frame structure 26 which includes side plates 28 and 29 (FIGS. 2 and 3) at each of the stations.

The strip 10 entering the apparatus from the unwinding reel 12 has opposed upper and lower faces 30 and 32 and longitudinally parallel side edges 34 and 35 (FIG. 2). The strip 10A leaving the apparatus from the levelling station 22 is in the configuration of a battery grid with expanded segments 36 forming reticulations 38 and 39 extending inwardly from the side edges 34 and 35 to a medial unexpanded portion 40 of the strip. A plurality of equally spaced apertures 42 have been provided in the medial portion 40.

These apertures 42 are formed in the perforating station 18 which includes rotary die means comprising a pair of rotary cutting dies 44 and 45 for cutting slugs in the shape of the apertures, and a pair of stripping dies 46 and 47 for ejecting the slugs from the strip into a chute 48, the stripping die 46 being provided with projections 50 for this purpose. Alternatively, the rotary die means may consist of a single pair of male and female dies which would form the apertures 42 in one operation. The construction of such dies is conventional and hence has not been shown in detail; however, the spacing between the apertures 42 formed thereby is related to the feeding of the strip as will be hereinafter explained. Each pair of the dies, 44, 45 and 46, 47 is supported between the side plates 28 and 29 of the frame in a manner customarily employed in rotary web processing machinery. Parallel transverse shafts 51 and 52 to which a pair of dies are keyed are rotatably mounted in pairs of bearing blocks 53 and 54, with each pair of bearing blocks slidably engaging vertical guides 55 in one of the side plates, and with the upper bearing block 53 adjustably positionable by an adjusting screw 56 carried by a removable plate 57 at the upper end of the guides.

The segment expanding stations 20 are arranged successively along the path of travel of the strip 10 and are designated 20-1 through 20-5 in FIG. 1. All of these stations are similar in construction and operation. Consequently, only five stations have been shown to illustrate the invention and it will be understood from the following description that the exact number of segment expanding stations employed in a particular apparatus embodying the invention will depend upon the number of rows of segments 36 to be formed in each of the reticulations 38 and 39 of the strip 10.

Referring to FIGS. 1-3, each of the stations 20 includes a pair of shearing rollers 62 and 63, supporting roller means in the form of a pair of supporting rollers 64 and 65, and mounting means (similar to that described above for the dies 44-47) carried by the frame side plates 28 and 29 for supporting these rollers for rotation with parallel shafts 66 and 67 whose axes are transverse to the path of travel of the strip 10 and spaced from the opposed faces 30 and 32 of the strip. In the preferred apparatus shown, the shearing rollers 62 and 63 of all stations 20 are coaxially mounted on the shafts 66 located in parallel spaced relation to the upper face 30 of the strip 10; and, the supporting rollers 64 and 65 of all the stations 20 are coaxially mounted on the shafts 67 located in parallel spaced relation to the lower face 32 of the strip 10. All shearing rollers 62 and 63 of the stations 20 are identical to each other, as are all supporting rollers 64 and 65.

Each of the stations 20 also preferably includes feeding means for engaging and advancing the strip 10 along the path of travel. As shown in FIG. 3, the feeding means comprises a feeding roller 68 keyed to the shaft 67 intermediate the supporting rollers 64 and 65, and provided with a plurality of peripheral projections 69 equally spaced so as to be engageable with the apertures 42 in the medial portion 40 of the strip. This engagement of the projections 69 with the apertures 42 also maintains the strip 10 in centered relation to the path of travel.

Drive means illustrated in FIGS. 2 and 3 is coupled to the shafts 66 and 67 of all of the expanding stations 20 for rotating the shearing, supporting and feeding rollers thereof in unison at equal rotational speed. A line shaft 70 connected to a drive unit 72 and extending along one side of the frame drives each pair of shafts 66 and 67 through a gear box 74, a coupling 76 and a gear set 77. The same driving arrangement, indicated by the schematic connections 78 in FIG. 2, is employed between the line shaft 70 and the pairs of shafts 51 and 52 at the perforating station 18 for rotating the dies 44-47 thereof in unison with all rollers of the expanding station and with equal rotational speed. This speed relationship of the dies 44-47 with the feeding rollers 68, together with a proper spacing therebetween along the path of travel of the strip 10 enables the strip to be positively and continuously advanced in precise synchronism with the rotation of all shearing rollers 62 and 63 for the forming of the expanded segments 36. Other forms of drive means may obviously be employed to obtain the desired speed relationship, including electronically synchronized motors coupled to the roller and die supporting shafts.

Figure 5:
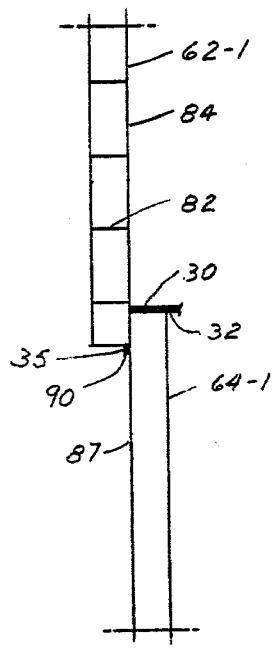
FIG. 5 is a sectional elevation taken as indicated by the line 5—5 of FIG. 4.

Details of the shearing rollers 62-1 and 62-2 at the first two expanding stations 20-1 and 20-2 appear in FIGS. 4 and 5, together with the relationship between these shearing rollers and their associated supporting rollers 64-1 and 64-2. Each shearing roller 62 has a base circle 80 and a periphery 81 formed by a plurality of lobes 82 each of which extends outwardly from and inwardly to the base circle in a configuration corresponding to that of one-half of an expanded segment 36-1 (FIG. 4). In other words, each of the lobes 82 has a circumferential length along the base circle 80 corresponding to the length of a segment and has a maximum radial depth or projection from the base circle 80 corresponding to one-half the width of a complete expanded segment 36-2. All of the lobes 82 have shearing faces 84 (FIGS. 3 and 5) lying in a common plane perpendicular to the axis of the shearing roller.

Figure 7:
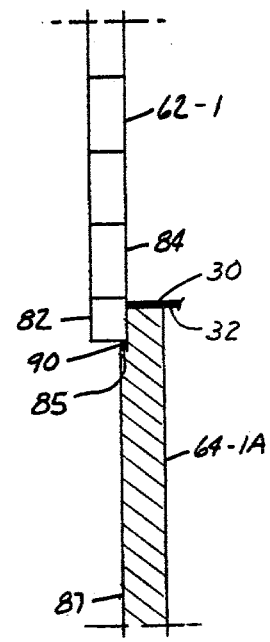
FIG. 7 is a sectional elevation taken as indicated by the line 7—7 of FIG. 6.
Figure 6:
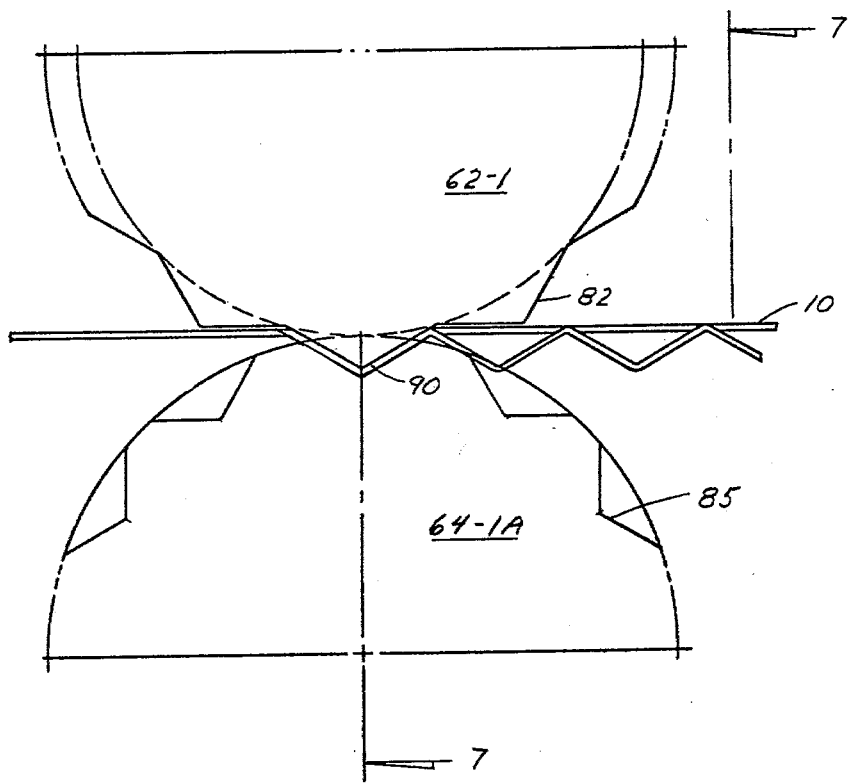
FIG. 6 is a side elevation similar to FIG. 4, showing a modified form of one expanding station.

Each supporting roller 64 has a cylindrical periphery 86 with a diameter equal to the diameter of the base circle 80 of each shearing roller, and has an axially perpendicular end face 87 which is overlapped by and is in shearing relationship with the shearing faces 84 of the lobes 82 of the associated shearing roller. Alternatively, and as shown in FIGS. 6 and 7, the supporting roller 64-1A may be provided with female lobes 85 complimenting the lobes 82 of the shearing roller so that a strand 90 of an expanded segment is engaged between and positively shaped by the lobes 82 and 85.

The shearing and supporting rollers are conveniently considered as being arranged in successive pairs along the path of travel of the strip 10, as illustrated by the pair 62-1, 64-1 and 62-2, 64-2 in FIGS. 4 and 5, and there are certain relationships between each pair of shearing and supporting rollers and the strip as well as between each successive pair of shearing and supporting rollers and the strip.

FIGS. 4 and 5 show that the pair of shearing and supporting rollers 62-1, 64-1 at the first expanding station 20-1 are mounted so that the lobes 82 of the shearing roller 62-1 overlap and are engageable with a portion of the upper face 30 of the strip 10 adjacent one edge 35 thereof; and so that the periphery 86 of the supporting roller 64-1 engages the opposite face 32 of the strip. The upper face 30 of the strip is tangential to the base circle 80 of the shearing roller 62-1, the lower face 32 of the strip is tangential to the periphery 86 of the supporting roller 64-1, and these tangential relations lie in a plane of reference 88-1 containing the axes of the pair of shearing and supporting rollers 62-1, 64-1.

These same relationships are obtained at the second expanding station and at each successive expanding station by progressively offsetting each successive pair of shearing and supporting rollers from the edge 35 toward the medial portion, or longitudinal centerline 89 (FIG. 2) of the strip. The amount of offset corresponds to the width of the strip overlapped by the lobes of the shearing roller, which in turn is related to the width of metal in a strand 90 of an expanded segment. Successive expanding stations, as best illustrated in FIG. 4 for the stations 20-1 and 20-2, are located along the path of travel of the strip 10 so that their reference planes 88-1 and 88-2 are spaced apart a distance which is a multiple of one-half the length of a segment 36, the spacing between the planes 88-1 and 88-2 shown for illustrative purposes in FIG. 4 being five and one-half times the distance between the nodes 92 at the ends of successive segments.

The arrangement and relationship between the expanding stations 20-1 and 20-2 is duplicated for each successive pair of expanding stations employed to completely form the reticulations 38 and 39 along the sides of the strip 10.

In order to compensate for any tendency of the strip 10 to elongate in its passage through the apparatus and to prevent the formation of a loop or sag in the strip between successive stations, it may be necessary to provide a slight, progressive increase in the diameters of successive pairs of shearing and supporting rollers, in accordance with common practice in web processing machinery. With all rollers driven at equal rotational speed, this slight, proressive increase in diameter will result in a slight, progressive increase in the peripheral speed of each successive pair of rollers and will maintain the strip in the desired path of travel.

It will be apparent from the foregoing description that when the shearing, supporting and feeding rollers of all stations are rotated in unison at equal rotational speed, the strip 10 is advanced continuously along a horizontal path of travel and the reticulations 38 and 39 are progressively formed by shearing and expanding the segments thereof downwardly from the path of travel as indicated in FIG. 3. This progressive forming is schematically shown in FIGS. 1 and 2. The forming of the reticulations 38 and 39 is continuous, uniform and undistorted.

At the levelling station 22 following the last expanding station the downwardly extending reticulations 38 and 39 are formed back, or flattened into the plane of the medial portion 40 by passing the strip 10 between a pair of rollers 92 and 93 and optionally a third de-curling roller 94. These rollers are driven at the same rotational speed as the other rollers by a suitable driving connection 96 (FIG. 2) to the line shaft 70. A plow 98 mounted in advance of the levelling rollers is engaged by the reticulations and aids in the levelling operation.

I claim:

1. Apparatus for forming at least a portion of a strip of metal having parallel opposite faces and longitudinal edges into expanded segments of a reticulation extending inwardly from one of the edges of the strip comprising:

a frame;

feed means carried by the frame for continuously moving the strip lengthwide along a path of travel;

a series of pairs of rollers, each pair comprising a shearing roller and a supporting roller, and means carried by the frame for mounting the pairs of rollers at spaced intervals along the path of travel for rotation on parallel axes extending transversely to the path of travel, the axes of all shearing rollers being located in parallel spaced relation to one face of the strip and the axes of all supporting rollers being located in parallel spaced relation to the opposite face of the strip with the axis of each supporting roller of a pair of rollers aligned with the axis of the shearing roller of that pair;

each shearing roller having a base diameter and a periphery formed by a plurality of circumferentially spaced lobes projecting outwardly from the base diameter and provided with shearing faces lying in a common plane perpendicular to the axis of the shearing roller, each lobe having a circumferential length corresponding to the length of a segment of the reticulation and a radial depth corresponding to one-half of the width of said segment;

each supporting roller having a cylindrical periphery with a diameter corresponding to the base diameter of the shearing roller and an axially perpendicular end face;

each successive pair of shearing and supporting rollers being progressively offset with respect to one edge of the strip so that the lobes of the shearing roller overlap one face of the strip along one edge thereof by an amount corresponding to the width of the expanded metal, the periphery of the supporting roller engages the opposite face of the strip, and the end face of the supporting roller is overlapped by and is in shearing relationship with the shearing faces of the lobes of the shearing roller;

means for driving the shearing and supporting rollers in unison;

rotary die means mounted at the entrance end of the path of travel and driven in unison with the shearing and supporting rollers for forming longitudinally spaced indexing apertures in the strip, and wherein said feeding means comprises a plurality of feeding rollers carried by the frame and driven in unison with the shearing and supporting rollers, each feeding roller having projecting means engageable with said indexing apertures.

2. Apparatus according to claim 1, wherein each of said spaced intervals between successive pairs of rollers is an odd multiple of one-half the length of a segment of the reticulation.

3. Apparatus according to claim 1 or 2, wherein the path of travel of the strip is generally horizontal, the axes of all shearing rollers are located above the path of travel, and the axes of all supporting rollers are located below the path of travel.

4. Apparatus according to claim 3, wherein each feeding roller is mounted coaxially with one of the supporting rollers.

5. Apparatus according to claim 3, wherein said rotary die means comprises a pair of cutting dies and a pair of stripping dies.

6. Apparatus according to claim 1 further comprising levelling roller means carried by the frame following the last of the series of shearing and supporting rollers for forming the expanded strip into a common plane.

7. Apparatus according to claim 11 further comprising reel means for winding the expanded and levelled strip into a coil.

8. Apparatus according to claim 1 wherein each of said feeding rollers is mounted coaxially with one of the shearing and supporting rollers for rotation therewith.

9. Apparatus for forming from a strip of lead, having opposed faces and longitudinally parallel side edges, battery grid plates with expanded segments forming reticulations extending inwardly from the side edges to a medial unexpanded portion of the strip, said apparatus comprising:

frame structure;

a plurality of segment expanding stations carried by the frame structure and arranged successively along a path of travel of the strip;

each segment expanding station including a pair of shearing rollers each having a base circle and a periphery formed by a plurality of lobes each extending outwardly from and inwardly to the base circle in a configuration corresponding to that of one-half of an expanded segment, cylindrical supporting roller means, and means mounting the pair of shearing rollers and the supporting roller means for rotation on parallel axes extending transversely to the path of travel of the strip and spaced from the opposed faces of the strip, the pair of shearing rollers being co-axially mounted in transverse spacing for engagement with portions of one face of the strip adjacent to the side edges thereof, the supporting roller means being mounted for engagement with the opposite face of the strip intermediate the pair of shearing rollers and having a pair of axially perpendicular end surfaces overlapped by and in shearing relation with the lobes of the pair of shearing rollers;

driving means for rotating the shearing rollers and supporting roller means of all segment expanding stations in unison;

rotary die means mounted at the entrance end of the path of travel of the strip and driven in unison with the shearing rollers and the supporting roller means for forming longitudinally spaced indexing apertures in the medial portion of the strip; and, feeding means for engaging and continuously advancing the strip along the path of travel, said feeding means including a plurality of feeding rollers carried by the frame structure and driven in unison with the shearing rollers and the supporting roller means, each feeding roller having projecting means engageable with said indexing apertures.

10. Apparatus according to claim 9, wherein the base circles of the pair of shearing rollers are equal in diameter and are tangentially related to one face of the strip, the circumference of the supporting roller means is equal in diameter to the diameter of the base circles and is tangentially related to the opposite face of the strip, and said tangential relations are located substantially in a reference plane containing the parallel axes of the pair of shearing rollers and the supporting roller means.

11. Apparatus according to claim 10, wherein the distance along the path of travel between the reference planes of successive segment expanding stations is an odd multiple of one-half of the length of a segment.

12. Apparatus according to claim 9, wherein the path of travel of the strip through the segment expanding stations is generally horizontal, the axes of the pairs of shearing rollers of all segment expanding stations are located above the path of travel and the axes of the supporting roller means of all stations are located below the path of travel, whereby the reticulations are formed by progressively expanding the segments thereof downwardly from the path of travel.

13. Apparatus according to claim 12 further comprising levelling roller means carried by the frame structure following the last segment expanding station in the direction of travel for flattening the reticulations and the medial portion of the strip into a common plane.

14. Apparatus according to claim 13 further comprising reel means for winding the flattened strip into a coil.

15. Apparatus according to claim 9, wherein said end surfaces of the supporting roller means are provided with female lobes complimenting said plurality of lobes on the shearing rollers.

16. Apparatus according to claim 9 having one of said feeding rollers at each segment expanding station, said one feeding roller being coaxial and rotatable with one of the pair of shearing rollers and the supporting roller means.

17. Apparatus according to claim 16, wherein the supporting roller means comprises a pair of axially spaced supporting rollers and the feeding roller is coaxial with and intermediate the pair of supporting rollers.

* * * * *

UNITED STATES PATENT AND TRADEMARK OFFICE
CERTIFICATE OF CORRECTION

PATENT NO. : 4,247,970
DATED : February 3, 1981
INVENTOR(S) : WILLIAM C. BOLLINGER It is certified that error appears in the above—identified patent and that said Letters Patent is hereby corrected as shown below:

Column 1, line 29, "applied" should read -- applies --;

Column 7, line 1, "11" should read -- 6 --;

Column 8, line 5, "9" should read -- 9, 16 or 17 --;

Column 8, line 18, "9" should read -- 10 --.

Signed and Sealed this

Twenty-eighth Day of April 1981

[SEAL]

Attest:

RENE D. TEGTMEYER

Attesting Officer

Acting Commissioner of Patents and Trademarks